United States Patent [19]

Swisher

[11] Patent Number: 4,805,933
[45] Date of Patent: Feb. 21, 1989

[54] HOSE END SLEEVE

[75] Inventor: Jerald M. Swisher, Warrensburg, Mo.

[73] Assignee: Swisher Mower & Machine Co., Inc., Warrensburg, Mo.

[21] Appl. No.: 51,655

[22] Filed: May 20, 1987

[51] Int. Cl.$^4$ .............................................. F16L 35/00
[52] U.S. Cl. ....................................... 285/38; 285/115; 285/256
[58] Field of Search ................. 285/38, 115, 116, 256

[56] References Cited

U.S. PATENT DOCUMENTS

| | | | |
|---|---|---|---|
| 96,286 | 10/1869 | Thompson | 285/256 |
| 1,337,288 | 4/1920 | Stichler | 285/38 X |
| 1,971,500 | 8/1934 | Palmer | 285/116 |
| 2,236,731 | 4/1941 | Oberly | 285/115 |
| 2,487,554 | 11/1949 | Hurst | 285/256 X |
| 2,614,304 | 10/1952 | Oetiker | 285/256 X |
| 2,667,184 | 1/1954 | Hailer et al. | 285/115 X |
| 3,231,955 | 2/1966 | Taylor | 285/38 X |
| 3,345,086 | 10/1967 | Wallace | 285/38 |
| 3,784,236 | 1/1974 | Slocum | 285/115 X |
| 4,058,031 | 11/1977 | Magarian | 285/38 X |

FOREIGN PATENT DOCUMENTS

| | | | |
|---|---|---|---|
| 2102443 | 7/1971 | Fed. Rep. of Germany | 285/115 |
| 2104745 | 8/1972 | Fed. Rep. of Germany | 285/115 |

Primary Examiner—Thomas F. Callaghan
Attorney, Agent, or Firm—Litman, McMahon & Brown

[57] ABSTRACT

A hose end sleeve is provided which includes an elastomeric body with proximate and distal ends and a bore extending therebetween. The bore receives a female hose coupling nut adjacent the distal end whereat the body is expanded to receive the nut in a fixed engagement. The bore rotatably receives a hose tube extending from the female coupling so that the sleeve is adapted for rotating the coupling nut with respect to the hose tube.

1 Claim, 1 Drawing Sheet

U.S. Patent Feb. 21, 1989 4,805,933
Fig.1.
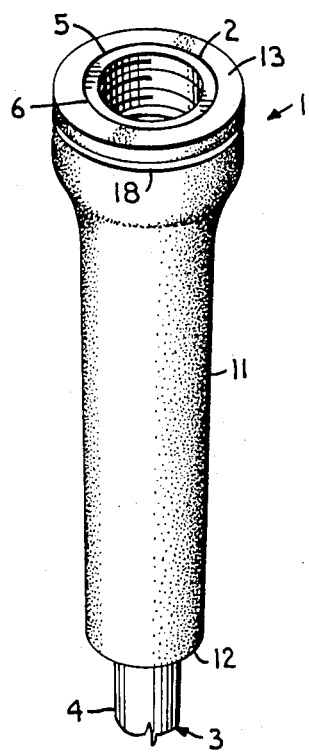
Fig.2.
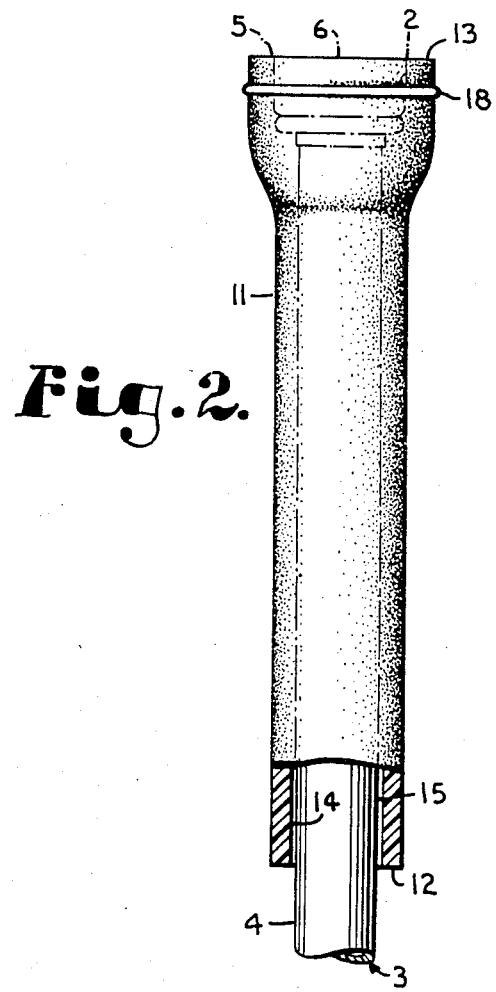
Fig.3.
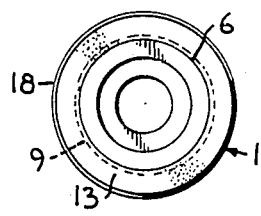
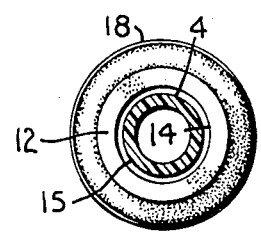
Fig.4.

HOSE END SLEEVE

BACKGROUND OF THE INVENTION

1. Field of the Invention

The present invention relates generally to hoses, and in particular to a sleeve for mounting over a female hose coupling.

2. Description of the Prior Art

Various types of hoses are commonly used for conveying fluids. For example, flexible hoses permit the conveyance of fluid to various locations. Hoses are often provided with end couplings which facilitate attachment to and detachment from fluid sources and various fluid-receiving devices.

A common type of hose comprises rubber or flexible plastic tubing with threaded male and female couplings at the ends. The female couplings of such hoses are designed to receive standard male-threaded hose bibs, which are typically provided on the exteriors of houses and other buildings. The female couplings of rubber and plastic hoses are attached to these hose bibs and their male couplings can be attached to sprinklers, sprayers, recreational devices, etc. In a typical exterior hose bib installation, the male threaded coupling is positioned within a few inches of an exterior wall and slants downwardly and outwardly therefrom.

A typical female hose coupling includes a rotatable nut threaded to receive a male-threaded hose bib coupling. Hose coupling nuts are often knurled or have wrench flats to facilitate threading them onto hose bib couplings.

A disadvantage of this arrangement is that the proximity of the hose bib coupling to the exterior wall provides very little working space for threading the hose coupling nut onto the hose bib coupling. Grasping the entire hose end coupling nut for coupling or uncoupling often leads to scraped knuckles, particularly if the exterior wall surface comprises a rough-textured material such as brick, stone, concrete or stucco. On the other hand, gripping the hose coupling nut between the thumb and forefinger is safer but applies less torque than using the entire hand. An effective, water-tight seal is difficult to achieve with the latter method. The aforementioned disadvantages of coupling a hose end and a hose bib by hand can be avoided by using pliers or a wrench, but obtaining and using a tool for each coupling and uncoupling procedure is inconvenient.

A second disadvantage with the aforementioned, prior art coupling system relates to the hose becoming crimped adjacent to its end whereby water no longer flows therethrough. If a flexible hose is pulled in a direction not aligned with the hose bib coupling, a crimp can occur. For example, with a typical hose bib having a downwardly and outwardly oriented coupling, crimping can occur if the hose is pulled in any other direction, e.g. horizontally away from the wall, straight down, etc.

The present invention addresses these disadvantages of a conventional hose coupling arrangement.

SUMMARY OF THE INVENTION

In the practice of the present invention, a sleeve is provided for mounting on a hose end with a female coupling. The sleeve includes an elastomeric body with proximate and distal ends and a bore extending longitudinally therebetween. The bore receives the female hose coupling adjacent to the sleeve body distal end whereat the sleeve body expands to grip the female hose coupling nut in a fixed attachment. The hose also includes a tube extending from the female coupling which is rotatably received in the bore.

Heretofore, there has not been available a hose end sleeve with the advantages and features of the present invention.

OBJECTS OF THE INVENTION

The principal objects of the present invention are: to provide a sleeve for female hose couplings; to provide such a sleeve which is adapted for fixed attachment to a female hose coupling nut; to provide such a sleeve which facilitates coupling and uncoupling a female hose coupling and a male hose bib coupling; to provide such a sleeve which reinforces a section of hose tubing adjacent to a female hose coupling; to provide such a coupling which resists hose tube crimping, to provide such a coupling which facilitates coupling and uncoupling a female hose coupling on a male hose bib coupling in close proximity to a surface; to provide such a hose coupling which enhances the leverage and torque that can be applied in coupling and uncoupling a hose end and a hose bib; and to provide such a hose coupling which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 a perspective view of a sleeve embodying the present invention mounted on a hose end with a female coupling.

FIG. 2 a side elevational view of the hose end sleeve with portions broken away to reveal internal construction.

FIG. 3 is a top elevational view of the hose end sleeve.

FIG. 4 is a bottom elevational view of the hose end sleeve.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a hose end sleeve embodying the present invention. The sleeve 1 is mounted on an end 2 of a hose 3 comprising a flexible rubber or plastic tube 4 mounting a female hose coupling 5 at the hose end 2. The hose coupling 5 includes a rotatable, threaded nut 6. The nut 6 is adapted to threadably receive the male-threaded coupling of, for example, a hose bib (not shown).

The hose end sleeve 1 includes a body 11 comprising an elastomeric material. The body 11 terminates at proximate and distal ends 12, 13 and includes a bore 14 extending between and open at the ends 12, 13. The bore 14 has a diameter slightly less than that of the hose coupling nut 6 and slightly greater than that of the hose tube 4. Thus, when the sleeve 1 is placed on the hose end 2, its distal end 13 expands to accommodate the nut 6 and the remainder of the bore 14 loosely receives the hose tube 4. An annular clearance 15 is provided between the sleeve bore 14 and the hose tube 4. The sleeve distal end 13 is tightly clamped on the nut 6 by a brass ring 18 swaged onto the sleeve distal end 13. Adhesive 9 may be applied between the hose coupling nut 6 and the sleeve distal end 13.

In operation, the fixed attachment of the sleeve distal end 13 to the nut 6 cooperates with the loose fit between the remainder of the sleeve bore 14 and the hose tube 4 whereby the sleeve 1 may be used to rotate the nut 6 with respect to the hose tube 4. The hose 3 can thus be coupled to a hose bib by grasping the sleeve 1 in spaced relation from its distal end 13. In typical situations where the hose bib is mounted fairly close to an exterior wall, the sleeve 1 permits threadably coupling or uncoupling the hose 3 and hose bib without engaging the exterior wall so that scraped knuckles are avoided.

The sleeve 1 also enables more torque to be exerted for coupling and uncoupling the hose 3 and the hose bib since the elastomeric material which it comprises has a relatively high coefficient of friction. Furthermore, the greater circumference of the sleeve 1 at its expanded distal end 13 provides greater leverage for applying torque to the nut 6 if necessary.

Yet another cooperative function of the sleeve 1 is to reinforce the hose tube 4 at the hose end 2. The elastomeric material of the sleeve 1 permits a gradual bending of the hose tube 4, but effectively resists crimping.

It is to be understood that while certain forms of the present invention have been illustrated and described herein, it is not to be limited to the specific forms or arrangement of parts described and shown.

What is claimed and desired to be secured by Letters Patent is as follows:

1. In combination with a hose end including a tube terminating at and connected to a female hose coupling with a threaded, rotatable nut, the improvement of a sleeve, which comprises:
   (a) a rubber body;
   (b) a proximate end;
   (c) a distal end;
   (d) a longitudinal bore extending between and open at said proximate and distal ends;
   (e) the nut being permanently and fixedly received in the bore at said sleeve distal end with said sleeve distal end expanded to receive the nut;
   (f) said bore having a greater diameter than the hose tube whereby an annular clearance is provided between the hose tube and the sleeve body and the hose tube is freely rotatable within the sleeve bore;
   (g) an annular, brass compression ring swaged onto said body distal end, said body distal end when expanded to receive said nut having an outside diameter greater than an inside diameter of said compression ring whereby said compression ring compresses said sleeve distal end onto the nut;
   (h) said body proximate end being positioned a distance sufficient from the hose coupling to resist crimping the hose tube at its connection with the hose coupling; and
   (i) adhesive between said body and the nut for providing a fixed connection therebetween.

* * * * *